United States Patent
Goldman et al.

(10) Patent No.: US 9,747,131 B1
(45) Date of Patent: Aug. 29, 2017

(54) SYSTEM AND METHOD FOR VARIABLE AGGREGATION IN ORDER FOR WORKERS IN A DATA PROCESSING TO SHARE INFORMATION

(75) Inventors: Kenneth Jerome Goldman, Palo Alto, CA (US); Anthony Mancuso, Berkeley, CA (US)

(73) Assignee: Google Inc., Mountain View, CA (US)

( * ) Notice: Subject to any disclaimer, the term of this patent is extended or adjusted under 35 U.S.C. 154(b) by 530 days.

(21) Appl. No.: 13/480,226

(22) Filed: May 24, 2012

(51) Int. Cl.
| | |
|---|---|
| *G06F 9/46* | (2006.01) |
| *G06F 9/455* | (2006.01) |
| *G06F 9/48* | (2006.01) |
| *G06F 11/20* | (2006.01) |
| *H04L 29/08* | (2006.01) |
| *G06F 17/30* | (2006.01) |
| *H04L 12/26* | (2006.01) |

(52) U.S. Cl.
CPC ........ *G06F 9/4881* (2013.01); *G06F 11/2023* (2013.01); *G06F 17/30424* (2013.01); *H04L 67/10* (2013.01); *H04L 43/08* (2013.01)

(58) Field of Classification Search
None
See application file for complete search history.

(56) References Cited

U.S. PATENT DOCUMENTS

| | | | |
|---|---|---|---|
| 7,100,195 B1* | 8/2006 | Underwood | G06F 9/4443 707/999.009 |
| 7,650,331 B1* | 1/2010 | Dean et al. | 712/203 |
| 8,189,566 B2* | 5/2012 | Bakshi | H04L 12/66 370/352 |
| 8,549,518 B1* | 10/2013 | Aron et al. | 718/1 |
| 2003/0135677 A1* | 7/2003 | Louzoun et al. | 710/240 |
| 2008/0052718 A1* | 2/2008 | Hundscheidt | H04L 12/5695 718/104 |
| 2008/0126547 A1* | 5/2008 | Waldspurger | G06F 9/4881 709/226 |
| 2009/0165018 A1* | 6/2009 | Junqueira et al. | 719/313 |
| 2012/0246653 A1* | 9/2012 | Boruhovski et al. | 718/102 |
| 2012/0304095 A1* | 11/2012 | Dennis | 715/771 |
| 2012/0324459 A1* | 12/2012 | Agarwal et al. | 718/102 |
| 2013/0204948 A1* | 8/2013 | Zeyliger et al. | 709/206 |
| 2013/0247069 A1* | 9/2013 | Chen et al. | 718/107 |
| 2013/0311643 A1* | 11/2013 | Kulkarni | 709/224 |

OTHER PUBLICATIONS

Dean et al., "MapReduce: Simplified Data Processing on Large Clusters", Oct. 2004.*

* cited by examiner

*Primary Examiner* — Bradley Teets
(74) *Attorney, Agent, or Firm* — Fish & Richardson P.C.

(57) ABSTRACT

A method and a system for variable aggregation among large-scale data processing workers is discussed. Workers join groups and add variables to the groups. One worker is elected as the group leader. Workers post values to group variables, which are aggregated by the leader. The leader also announces the aggregated values. This variable aggregation allows for asynchronous communication among data processing workers.

14 Claims, 7 Drawing Sheets

SYSTEM AND METHOD FOR VARIABLE AGGREGATION IN ORDER FOR WORKERS IN A DATA PROCESSING TO SHARE INFORMATION

BACKGROUND

Large-scale data processing involves extracting data of interest from raw data in one or more datasets and processing the extracted data into useful product. The implementation of large-scale data processing in a parallel and distributed environment may include disseminating data and computations among multiple disks and processors to make use of aggregate storage space and computing power.

A master-worker design pattern may be used for large-scale data processing. This pattern consists of a work task master (master) and one or more worker instances. In the master-worker processing system, the master takes a data processing problem and divides it into smaller tasks which are executed by the worker processes.

Figure 1:
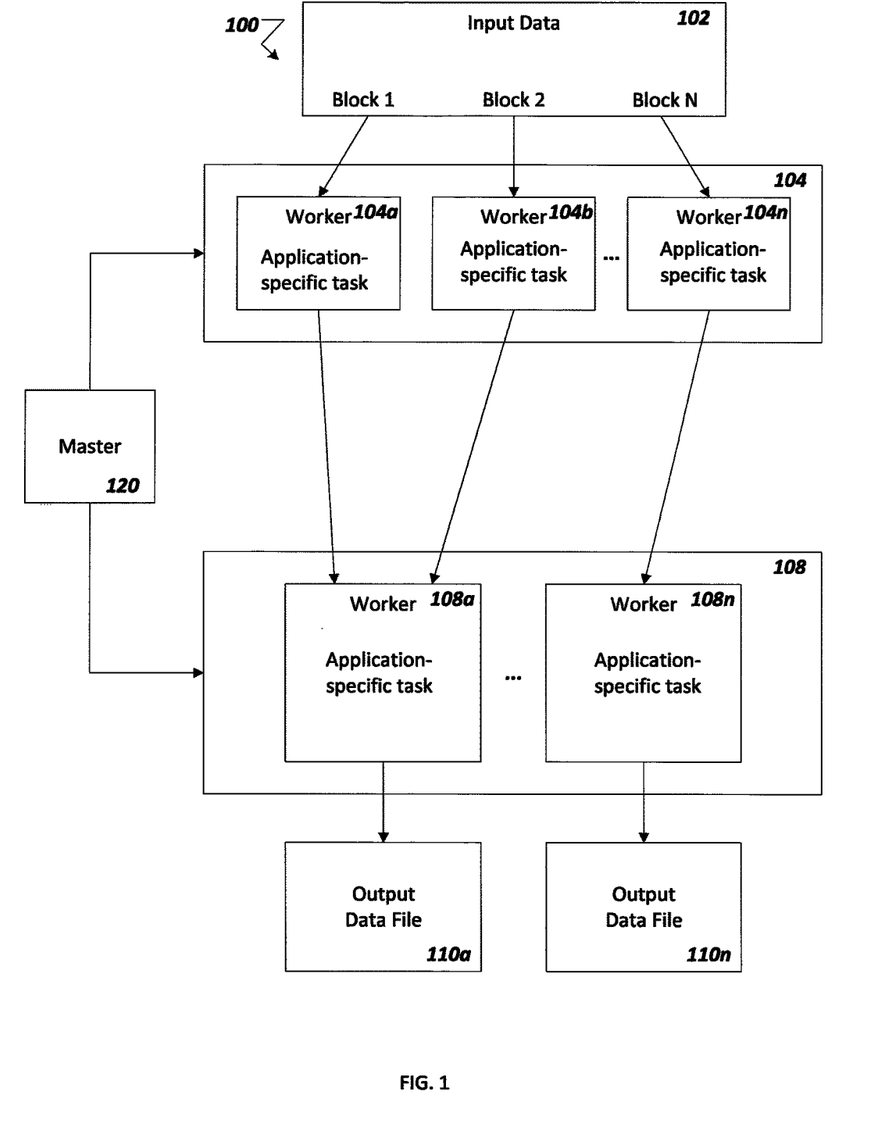
FIG. 1 is a block diagram illustrating an exemplary large-scale data processing system.

FIG. 1 illustrates an example of a conventional master-worker distributed system as discussed above. In the conventional system, a master (120) assigns data processing tasks to workers (104, 108). The system receives a data set as input (102), divides the data set into data blocks (101), performs application-specific tasks, and produces final output files (110a, 110n). A given worker performs its assigned task and notifies the master when the task is complete. Although FIG. 1 shows a certain two-stage worker system with two sets of workers (104 . . . 104n), (108a . . . 108n), a distributed data processing system may only include one stage of workers.

An exemplary conventional system is commonly referred to as the MapReduce model and is described in detail in MapReduce: Simplified Data Processing on Large Clusters, OSDI'04: sixth Symposium on Operating System Design and Implementation, San Francisco, Calif., December, 2004 and U.S. Pat. No. 7,650,331. However, the present patent is not limited to the MapReduce context, but rather to the broad class of distributed parallel processing applications.

SUMMARY

This specification describes technologies relating to large-scale data processing, and specifically to a system and a computer-implemented method for asynchronously aggregating variables in order for workers in a data processing to share information.

In general, one aspect of the subject matter described in this specification can be embodied in a system and method for distributed processing of data. An exemplary system includes one or more processing devices and one or more storage devices. The storage devices store instructions that, when executed by the one or more processing devices, cause the one or more processing devices to: execute a plurality of processors on a plurality of interconnected processing devices, including a plurality of worker processes belonging to a group; associate one or more metrics with the group; one or more workers in the group post a value to the associated metric; asynchronously aggregate the latest posted value from each worker for a given metric; and asynchronously announce the aggregated metric to the workers. An exemplary method includes executing a plurality of processes on a plurality of interconnected processing devices, including a plurality of worker processes belonging to a group; associating one or more metrics with the group; one or more worker processes in the group posting a value to an associated metric; aggregating the latest posted values for the given associated metric; and announcing the aggregated metric to the workers. Another exemplary method includes: receiving the data processing job; executing a plurality of processes on a plurality of interconnected processing devices, including a plurality of worker processes belonging to a group; associating one or more metrics with the group; one or more workers in the group posting a value to the associated metric; asynchronously aggregating the latest posted value from each worker for a given metric; and providing a display to display information about the data processing job.

These and other embodiments can optionally include one or more of the following features: aggregating the latest posted values and announcing the aggregated metric to workers may be done asynchronously; a lead worker may be chosen among the group workers to aggregate values for the group metrics and announce the aggregated metrics to the other workers; a lead worker may be chosen by election-protocol; standby leaders may be included to maintain history of workers' posts, preserve metric values, and may take over as lead worker if a lead worker fails or leaves the group; aggregating may include using a pre-defined aggregator variable type; pre-defined aggregator variable types may be a sum, a minimum, a maximum, an average, an aggregated histogram, a string set, an echo, a resource limit or an on demand variable set; aggregation may occur using a custom aggregator variable type; announcing the aggregated metric to the workers may be delayed using a delay timer; the aggregated variable type may be custom serialized or deserialized; the aggregator variable type may custom serialized or deserialized; the aggregated metric may be serialized as a protocol buffer; and a group may provide constructors that us a mapreduce specification to automatically derive a unique group name shared across the data processing job.

The details of one or more embodiments of aspects of the inventive concepts are set forth in the accompanying drawings, which are given by way of illustration only, and the description below. Other features, aspects, and advantages of the aspects of the inventive concepts will become apparent from the description, the drawings, and the claims. Like reference numbers and designations in the various drawings indicate like elements.

DETAILED DESCRIPTION

In a large-scale master-worker distributed data processing system, such as MapReduce, a worker communicates with a master by message passing. Although the master communicates with workers, an individual worker may be unaware of other workers in the system. This ignorance of other workers may be problematic as workers contend for shared resources. Too many workers competing for a resource at the same time may cause system congestion. Conversely, workers using less than their allocated share of system resources cause system resources to remain idle. In order to avoid resource contention or under-utilization of a system, workers should make decisions about shared resources based on an understanding of the state of the system as a whole.

For example, workers may be querying a database at various query rates. If the database receives too many queries at once, it cannot function properly and may crash. A worker may want to adjust the number of queries it sends per second to a database if it knows the query rates of other workers. Knowing the database query rates of other workers can help the worker determine the optimal number of queries to send per second to the database in order to ensure that the database is not overwhelmed by workers' queries. For workers to be able to make such decisions based on the actions of other workers, workers need a way to share query rate information and communicate with one another.

According to an exemplary embodiment, workers may use variable aggregation to communicate with one another regarding shared variables during execution of a large-scale, distributed data processing job. A worker may publish a value that denotes its use of a shared resource using a variable. Other workers can publish to the variable and may receive information about the variable through variable aggregation. This variable aggregation, which occurs at a worker that is designated as the leader, includes collecting values for each shared variable from workers and announcing information about the collected variable values to all workers.

Although a master could be used for aggregating variables, there are several reasons why a master should not do the aggregation. First, the actual aggregation implementation may be application-specific. In order to understand application-specific aggregation, a master may require application-specific code in its process. However, some application-specific code may not be well-tested. A master process is more likely to crash if less-tested application-specific code is executed on the master. It is difficult to debug a data processing job in which a master process keeps crashing. Therefore inserting application-specific code is not desirable.

Second, it is desirable to avoid adding more computational load to the master. The master is already burdened with tasking workers to do work. The master does not need additional responsibilities.

Third if a master was used for variable aggregation and the master crashed, the workers would not be able to continue sharing their variables and receiving the aggregated variable state until the master recovered and resumed processing. An additional reason for not using a master for variable aggregation is that the exemplary embodiment may be extended to a pure peer-to-peer system in which there is no designated master.

Even though there are several reasons why a master should not be used to aggregate variables, it is still possible for the master to do the aggregation.

Aspects of the inventive concepts assume a pre-existing communications membership service that allows workers to find out about each other and establish communication with one another using a group model. The membership service keeps track of all the workers in a particular group and allows workers to join and leave the group at will. Each worker has a client that, given a unique group name, joins a group's membership service based on the given group name. Workers that are group members may be identified by id and can publish data values for shared variables that all other workers in the group can see.

Figure 2:
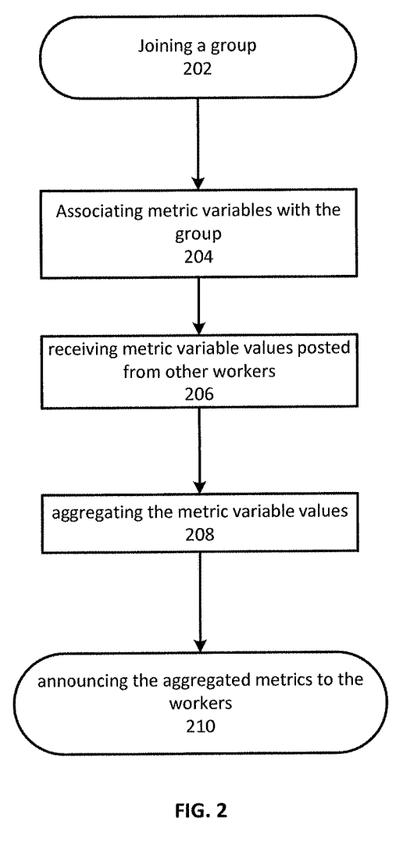
FIG. 2 is a flow diagram of an exemplary method for asynchronously aggregating variables in order for workers in a data processing job to share information.

In an exemplary embodiment as depicted in FIG. 2, communication is automatically established among workers using the pre-existing membership service described above. Workers do not need to know about each other in advance, but can join groups to communicate with each other (202).

To join a group, a worker may create an AggregatedVariableGroup object. All workers in a group use the same group name and each group worker has a unique id. For example, if the group name is "group_name" and the joining worker's id is "worker?", the AggregatedVariableGroup object, "group," can be created using a constructor for an AggregatedVariableGroup object that may take a worker's id and a group_name as parameters.

Although workers commonly join groups by group name, in some embodiments the group name cannot be hard-coded into a data processing job because multiple distinct instances of the same job may run in parallel. Hard-coding the group name would cause all workers from different data processing job instances of the same job to join one group. However, workers do not share variables across data processing job instances so communication across data processing job instances does not make sense. Although different data processing job instances use the same resources, each instance is allocated its own resource amount. Workers within the instance must share this allocated resource amount. By sharing information about their individual usage with one another the workers can know how much of a given resource is being used by the data processing job instance at a given time.

An exemplary embodiment provides a subclass of AggregatedVariableGroup called MapReduceAggregatedVariableGroup, which contains constructors that use a data processing specification to automatically derive a unique group name shared across the job. The specification can be used in a method, which returns a group name to the constructors:

In some embodiments, a group id is constructed using the master location file from the specification. A group name should be unique for each MapReduce job, but should be the same for all workers in the same job. By using the MapReduce job's specification to create the group name, this subclass also provides the option of constructing a worker id automatically based on the worker's task id or thread and timestamp. To use the MapReduceAggregatedVariableGroup, a MapReduceAggregatedVariableGroup is created instead of an ordinary AggregatedVariableGroup.

In general, a master-worker data processing system may have some unique identifier within the system's computing infrastructure such as a combination of the unique machine name on which the master was started and the time at which the master started. This unique identifier can be communicated to the workers and used to create a group name.

An exemplary embodiment also includes electing a lead worker (leader). The group leader is chosen through a leader-election protocol which can be based on group worker ids. For example, a worker may be selected as group leader because the worker has the smallest id of all the workers associated with the group.

After joining a group, a worker can add, or associate, one or more metric variables to the group (204). A worker adds a variable to a group by creating an AggregatedVariable object. Each worker has its own local copy of an aggregated variable. When a worker is the leader, the worker watches for values from the other workers and uses an aggregator to aggregate the values.

The AggregatedVariable object defines a specific aggregator and provides the aggregator with a name. For example, code may create an AggregatedVariable using the pre-defined "Sum" aggregator discussed below, where the aggregated variable values are of the integer (int) number type and the aggregate variable name is "sum".

The aggregated variable can then be added to a group using the method from the AggregatedVariableGroup called "Add."

Any group worker can post a value for one or more of the group's metric variables (206). Group workers are free to post variable values at whatever frequency is acceptable to the application. After a group worker posts a new value for a shared variable, the new value replaces that worker's previous value for that particular variable in an aggregator that the leader retains.

Workers can join multiple groups to share separate sets of variables. Group variables are organized into namespaces, which are abstract containers that hold logical groupings of unique identifiers. Namespaces are used so that each application execution, or each set of application components, can limit the scope of sharing to be within only that execution or set.

For each group variable, the leader aggregates the values that were posted by group workers for that variable (208).

To aggregate variable values, the leader instantiates an aggregator for each variable, listens for the variable values posted by group workers, and uses the instantiated aggregators to gather the values for each variable.

An exemplary embodiment provides pre-defined aggregators including Sum, Min, Max, Average, AggregatedHistogram, StringSet, Echo, ResourceLimit, and OnDemandVariableSet to aggregate variables.

The Sum aggregator adds each group worker's latest posted value for a particular variable and provides the result of that addition. The Min aggregator provides the minimum value for a particular variable from the group workers' latest posted values for that variable. The Max aggregator provides the maximum value for a particular variable from the latest posted values for that variable. The Average aggregator provides the average for a particular variable from the group workers' latest posted values for that variable. The AggregatedHistogram aggregator provides a histogram of each group worker's latest posted values for a particular variable. The StringSet aggregator provides the set union of strings posted by group workers. The Echo aggregator provides the value that the leader most recently received from any group worker for that variable. The ResourceLimit aggregator provides group workers with the amount of additional resource each group worker can claim or should return based on group workers' posts regarding their current resource usage. The OnDemandVariableSet aggregator creates an aggregated variable on demand by name in response to a shared list of known variables possibly created by other group workers.

In addition to the pre-defined aggregators provided, applications may also define their own customized aggregators that can operate on application-specific data types. ResourceLimit aggregator which was originally created as a custom aggregator, but is now part of the pre-defined aggregators in the standard library.

After collecting variable values, the leader announces aggregated values to the group workers (210). These aggregated values automatically become available in the Aggregated Variable object locally stored at each worker so that the worker can observe the new value.

Serialization is necessary for both posts by group workers and announcements by the group leader. Serialization is the process of converting an object state into a format that can be stored, for example, in a file or memory buffer or transmitted across a network connection link and restored later in the same or another computer environment.

Each AggregatedVariable has two type parameters: the VariableType and the AggregatedType. When a posted value is sent from a group worker to the group leader, the variable value must be serialized. Similarly, the aggregated value is serialized when the leader is sending an announcement to the group workers. In most cases, serialization of the VariableType and AggregatedType can be handled automatically, but an application may use custom serialization by overriding methods, depending on whether the application needs custom serialization in VariableType, AggregatedType, or both types:

The variable value is serialized in the AggregatedVariable to send a post and deserialized in the Aggregator when the post is received. Similarly, the aggregated value is serialized by the Aggregator to send an announcement and deserialized in the AggregatedVariable when the announcement is received.

In some embodiments, the AggregatedType is most easily serialized as a protocol buffer. Rather than defining a custom serialization method to encode and decode the aggregated value to and from a string, it may be preferable to declare an AggregatedType as a protocol buffer type and then provide a separate method in the aggregated variable to get the actual value.

Protocol buffers are a way of encoding structured data in an efficient, yet extensible format. These buffers provide a language and platform neutral way of serializing structured data. To use a protocol buffer, information to be serialized should be defined as protocol buffer messages in .proto files. Each protocol buffer message is a small logical record of information containing a series of name-value pairs. After the protocol buffer messages are defined, the protocol buffer complier is run on the .proto files to generate data access classes in the programming language, such as C++ or Java, used by the application for creating, modifying, accessing, and automatically encoding and decoding protocol buffers. AggregatedHistogram is implemented this way.

Although group workers are allowed to post variable values at a frequency acceptable to the application, it may not be desirable for the leader to announce a new aggregated value in response to every new post made by a group worker, especially if the aggregated value is large. Therefore, aggregators may regulate announcements by imposing a delay. When a new announcement is ready, the aggregator can start a delay timer. When the timer expires, the latest aggregated value may be announced. This delayed announcement skips some of the intermediate values in order to control the total number of messages announced to the group. A default delay may be provided, but an application can change an aggregator's delay by setting the maximum announcement delay for an aggregator through a method call.

For example, if an aggregator's maximum announcement delay is set to ten seconds, the aggregator will wait up to ten seconds before sending an announcement regarding the new aggregated value in case a new post arrives that would cause the announced aggregated value to be different. If the delay timer is already started, each new post does not reset the timer, so if any announcement is pending, the latest announcement will go out within the delay time. Setting the delay value to zero will cause each new announcement to be forwarded immediately to the membership service for distribution to the group workers. However, since each new announcement for a variable replaces the previous aggregated value announcement, and since the membership service may buffer messages, a delay value of zero does not guarantee that each group worker will see an announcement in response to every value posted by a group worker. Some intermediate values may still be omitted.

The posts from the workers and the announcements from the leader are asynchronous, meaning that posts and announcements are delivered from a sender to a receiver without waiting for the receiver to be ready. Asynchronous message passing does not block other operations from occurring while messages are being passed back and forth. Since there is no blocking, asynchronous message passing allows for computations to occur while messages are being transmitted. The leader can compute and send an updated aggregated value at the exact time that a worker is updating the same variable.

As discussed above, when a worker posts a new value for a shared variable, the new value replaces that worker's previous value for that particular variable in the aggregated variable value that the leader retains. By default, the aggregated value for each variable includes only the values posted by current group workers, but the aggregated value can be configured to preserve the final value posted by departed group workers as well.

For example, if the aggregation is a sum, the aggregated value is the sum of the latest posts received at the leader for all current workers in the group. When a group worker quits, that worker's value is usually dropped from the sum. However, some applications may want to include the last value posted by each member even after a worker leaves the group. To preserve the last post of departed workers, the application can specify that the aggregation should preserve each group worker's final post by using a variable such as preserve_final_posts.

In some embodiments, preserve_final_posts may be a parameter of AggregatedVariableGroup's Add( ) method. Preserve_final_posts may a boolean that can either be set to true or false. When the boolean is set to true, the group leader will retain the posts for departed group workers. In this case, the aggregator will not be notified when a group worker quits. If a previous group worker rejoins, any newly-posted values will replace the preserved values posted by the former group worker, as if the worker never left.

If the leader leaves the group for any reason, the leader's history of posts by departed group workers is lost. However, one or more workers in the group can preserve final values as standby leaders that will maintain history and take over as leader if the leader fails or leaves the group. Standby leaders will preserve final values if a property for preserving final posts, such as "preserve_final_posts," is set to true on an aggregated variable as discussed above. To ensure that standby leaders preserve final values, the leader may echo posts by departed group workers to make them available for any new standby leaders. Standby leaders may be the next in line based on the ordering of their ids. An alternate AggregatedVariableGroup constructor may be provided in order for a user application to specify the number of standby leaders.

Figure 3:
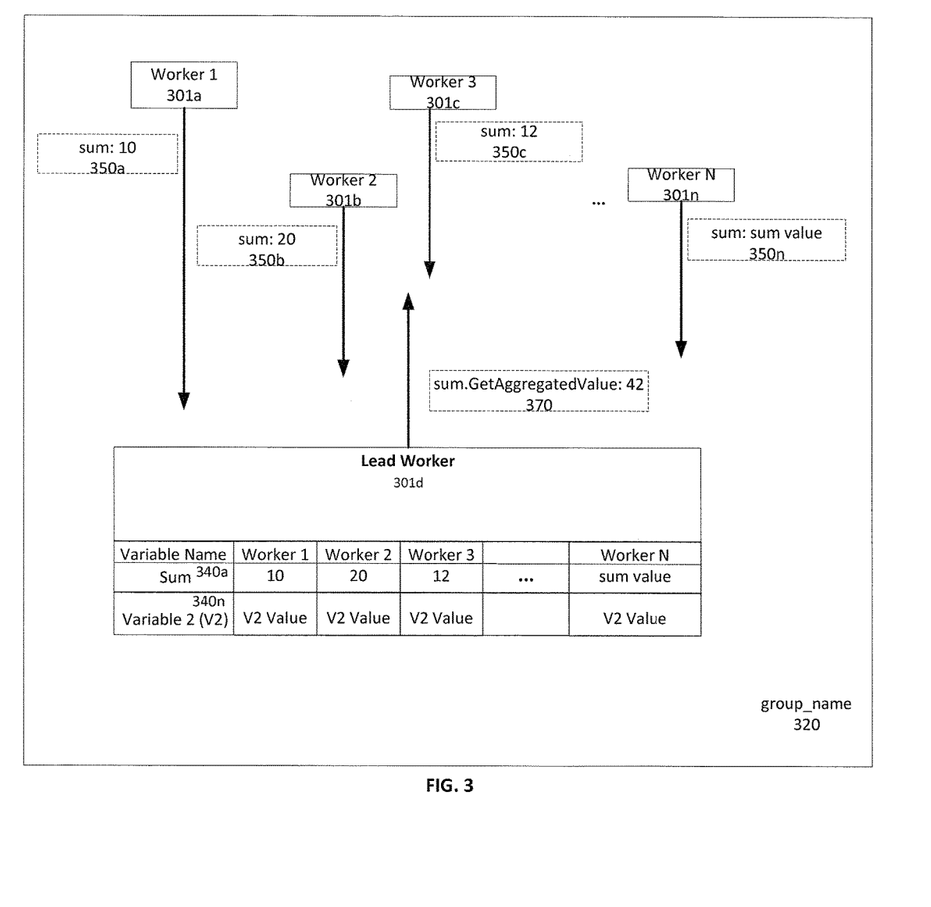
FIG. 3 is a block diagram illustrating an exemplary sum aggregation.

In an exemplary embodiment as depicted in FIG. 3, a worker (301a . . . 301n) can become a member of a group (320) and add one or more aggregated variables (340a . . . 340n) to the group (320). The worker can then post values (350a . . . 350n) to the aggregated variables (340a . . . 340n) and observe the most recent aggregated value of each of the group's variables (370).

In FIG. 3, Worker 1 (301a), posts the value "10" to the sum variable (350a). An AggregatedVariable, such as "sum," has a "Post( )" method which a worker may call to post AggregatedVariable values.

Two other workers (301b, 301c) may post the values "20" (350b) and "12" (350c) respectively to "sum" as illustrated in FIG. 3. The leader (301d) will announce new aggregated values for the variable after a defined delay. Since posted worker values and announced aggregated values occur asynchronously, intermediate values "0," "10," "12," "20," "22," "30", or "32" may be observed for the AggregatedVariable, "sum," before an aggregate final value, "42," is announced (370).

A worker can retrieve the latest aggregated value by asking for it directly as using a method such as GetAggregatedValue( ).

The GetAggregatedValue( ) method will provide the requesting worker with the value from the last announcement that the worker received for the AggregatedVariable on which it was called.

Figure 4:
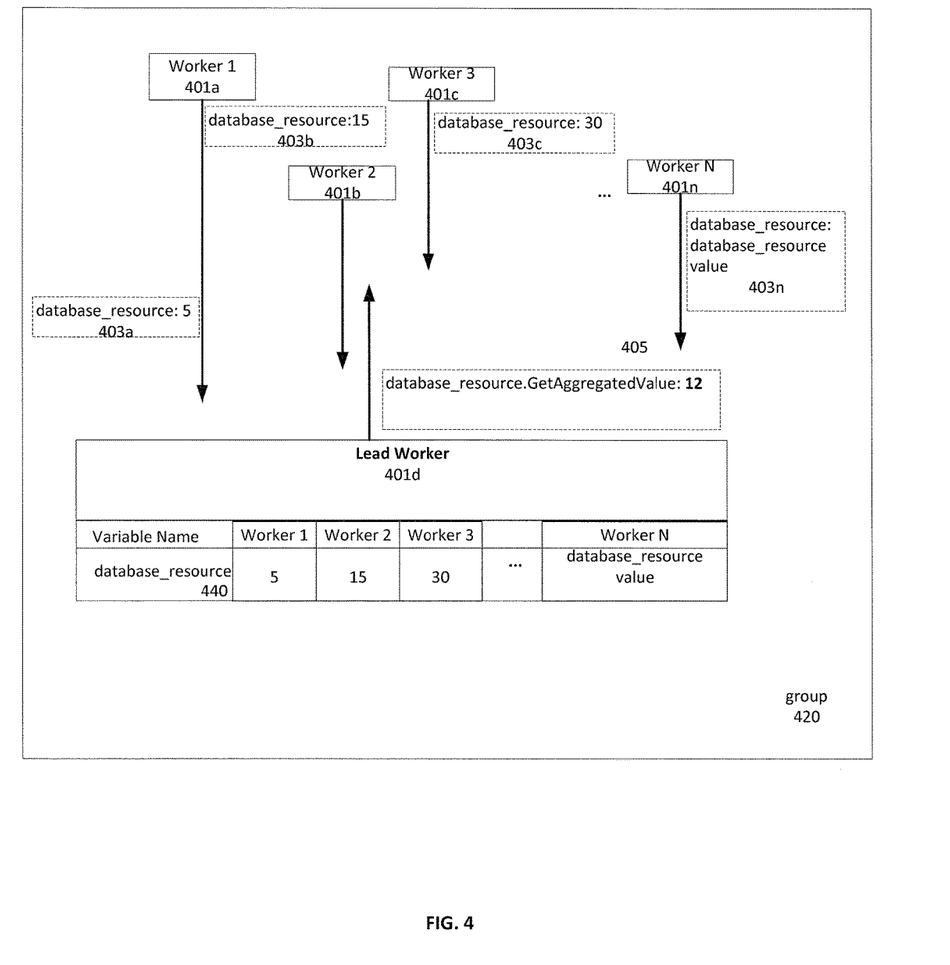
FIG. 4 is a block diagram illustrating an exemplary resource limit aggregation.

In another embodiment, the provided aggregated variable type ResourceLimit may be used to control access to a global resource as illustrated in FIG. 4. Workers (401a . . . 401n) may have to share a resource budget, but an individual worker sometimes claims more or less of a resource than its budgeted amount. The default budget for the remaining workers is then based on the posted resource consumption across all workers.

For a given shared resource, a ResourceLimit aggregator can be added to a group and each group worker (401a . . . 401n) can then provide details about that group worker's resource use. These details may include the amount of the resource the group worker is using or the rate at which the group worker is using the resource.

An example for using a ResourceLimit aggregate variable is a data processing job in which each worker competes for database access. If the workers all query the database at a high rate, the database could easily be overwhelmed with query requests, and the query response times from the database could rapidly decrease or the database could crash completely. However, if there are only a few workers remaining in the job, or if most of the other workers have low query rates, it may be desirable for a worker to increase its query rate in order for the worker to complete its work faster. In order to avoid database congestion and contention among workers for database resources yet maintain efficient use of the database, a ResourceLimit aggregate variable can tell workers the optimal rate at which to query the database.

In order for workers to communicate about the query rate, a ResourceLimit aggregated variable (440) should be added to the group (420) with which the workers are associated.

The ResourceLimit aggregate variable may be created with several default parameters including: the resource limit that is being calculated by this variable; the global rate of database access across the job in which the workers are working, the default rate at which all workers should start in terms of queries per second, a specified number of minimum workers that should join a group before the leader can begin making announcements that allow workers to go beyond their initial limit, and the time between announcements from the leader.

A worker (401a . . . 401n) can call a method such as GetAggregatedValue( ) on an aggregator of ResourceLimit type to obtain the amount of the shared resource remaining, divided by the number of workers in the group as illustrated in FIG. 3 (405). In the example depicted in FIG. 4, the total number of queries that the database can handle may be 100 queries per second, for example. The workers (401a . . . 401n) could have posted an aggregated rate of 52 queries per second (403a, 403b, 403c). Therefore, the database can handle an additional 48 queries per second. When this number is divided by the current number of workers (401a . . . 401n), 4, an aggregated value of 12 is obtained. Each worker can query the database at a rate of 12 queries per second faster than they are currently querying.

A worker can determine its optimal local query-per-second rate by calling GetLimit( ) on "database_resource." The GetLimit( ) method returns the sum of the requesting worker's latest posted value plus the aggregated value announced by the leader, or the default limit if the leader has not yet announced anything.

In this example, Worker 1 (401a) has posted a value of 5 queries per second (403a). The leader has announced an aggregated value of 12 queries per second (405). Therefore, GetLimit( ) for when called by Worker 1 (401a) should return 17 queries per second.

A function, such as QueryLimit, may compute the actual limit of queries per second that can be executed by a particular worker. This limit may be less than the limit provided by the aggregated variable. To guarantee that the limit is less than or equal to the limit provided by "database_ resource," a less than or equal check may be performed. If the local query limit is less than or equal to the aggregate variable value, the local query per second rate is posted so that the leader can update its view of the availability of resource.

Updates to aggregate variables of type ResourceLimit are asynchronous like all other aggregate variable types. Workers can also join or leave the group containing the Resource-Limit variable. Since the leader and the workers may have a stale view of the global state because of asynchronous updates, occasionally the sum of the local limits of a given ResourceLimit aggregate variable may exceed the global limit.

To achieve a maximum global rate in this example, as workers leave the group departed group workers' values are dropped from the total resource in use. If instead the goal is to cap the use of a consumable resource, such as disk space that continues to be used even after the worker terminates, the final posts for the variable would be preserved from each worker, and the AggregatedVariableGroup would be created with standby leaders to ensure preservation of posts by group workers that have left the group.

In some embodiments, it is convenient to have a set of aggregated variables of a given type created by name on demand. For example, an application might create a set of counters of type Sum<int>. A group worker may add to the counter set by creating new counters when needed. All other group workers can automatically create an aggregated variable for that counter and can use it just like any other aggregated variable. When an OnDemandVariableSet is added to a group, it must be added with final posts preserved from each group worker, regardless of whether the worker is current. The group should also have at least one standby leader. If no standby leader is created, a future leader may not see variable names previously posted by group workers that have left the group, and aggregation of those variables will stop. The application can decide whether or not the variables within the set preserve their final posts.

Final posts may not be preserved for individual variables in the creation of the OnDemandVariableSet. However, final posts are always preserved for the OnDemandVariableSet itself to maintain the set of variables even if the current leader leaves the group.

To post a value to a variable in the OnDemandVariable-Set, the variable is retrieved from the set by name. If the variable doesn't exist in the set, it will be created when it is required. Alternatively, a pointer to the created variable can be saved to avoid accessing the variable by name each time.

Although there are many useful predefined aggregated variable types, user applications may also define new aggregated variable types. To define a new type, a user application may define an aggregator class, which is a subclass of Aggregator. The new aggregator class should provide a default value as the second parameter to the parent constructor. This value is used as the "old" value when group workers join and the "new" value when workers leave the group. The class should keep track of the latest aggregated value, and update the aggregated value as group workers join and leave. The class must define a method that specifies how the aggregated value should change when a group worker's posted value changes. The class should also announce the new aggregated value when the value has changed.

An Aggregator class definition may include two template type parameters. The first parameter may represent the type of the posted value and the second parameter may represent the type of the aggregated value. In general, these two values are often different. For example, group workers may post a single number, but the aggregated value may be a histogram. However, the posted type and the aggregated type can be the same type, for example NumberType, given as the template parameters.

An Aggregator class may also contain a method that specifies how the aggregated value should change when a group worker's posted value changes. For example, in a sum aggregator class, the aggregated total may be changed by adding the difference between the worker's old posted value and the worker's new value.

The user application should also define a corresponding aggregated variable class, a subclass of AggregatedVariable that defines a method to create an object of the appropriate aggregator type. This method may be called in the leader when aggregation begins.

As discussed previously, aspects of the inventive concepts can be used in order for workers to make local decisions based on global information. Workers may want to make decisions based on a global view of a particular data processing job. Each worker may post local statistical information such as progress metrics, current worker state, and errors and exceptions.

Figure 5:
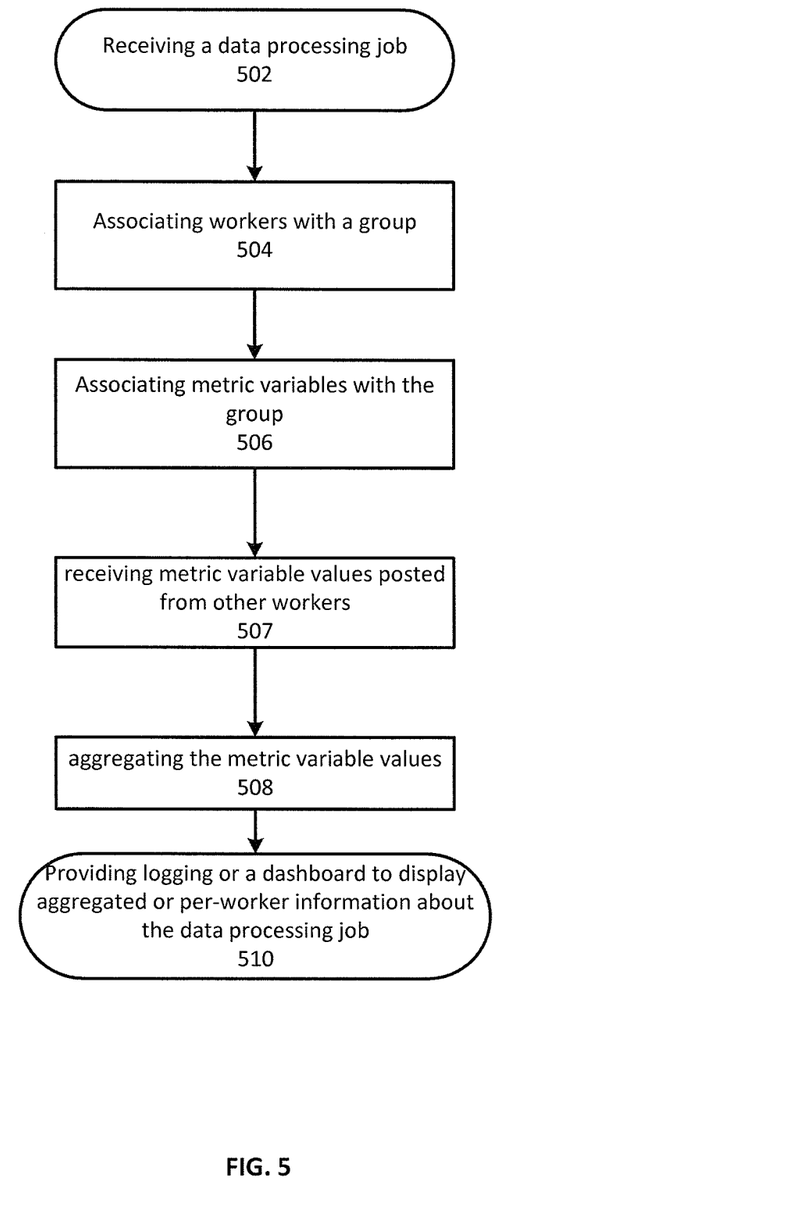
FIG. 5 is a flow diagram of an exemplary method for asynchronously aggregating variables in order for workers in a data processing job to share information.

In some embodiments, aspects of the inventive concepts can help a data processing job have centralized job control. A single worker, possibly the leader, can use the aggregator to make global decisions and announce them to the group based on information such as progress metrics and convergence to a target value. Job monitoring is also possible as illustrated in FIG. 5. One worker in the group could provide logging or a dashboard to display aggregated and/or per-worker information about the data processing job (510). This job monitoring can be useful for detecting stuck or slow workers based on a histogram of worker progress and performance optimization using aggregated variables that collect time spent in various tasks on each worker.

Figure 6:
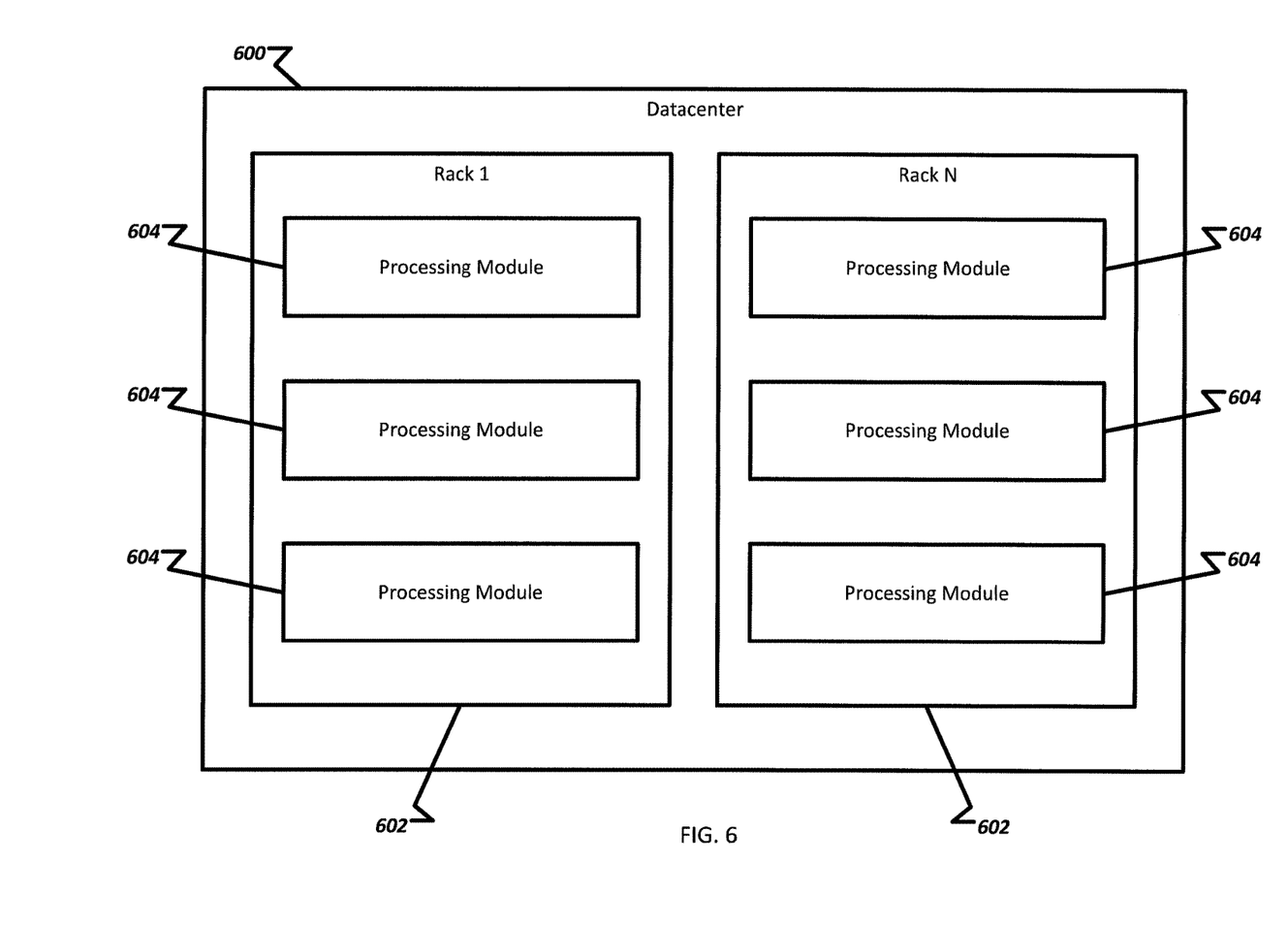
FIG. 6 is a block diagram illustrating an example data center.

FIG. 6 is a block diagram illustrating an example of a datacenter (600). The data center (600) is used to store data, perform computational tasks, and transmit data to other systems outside of the datacenter using, for example, a network connected to the datacenter. In particular, the datacenter (600) may perform large-scale data processing on massive amounts of data.

The datacenter (600) includes multiple racks (602). While only two racks are shown, the datacenter (600) may have many more racks. Each rack (602) can include a frame or cabinet into which components, such as processing modules (604), are mounted. In general, each processing module (604) can include a circuit board, such as a motherboard, on which a variety of computer-related components are mounted to perform data processing. The processing modules (604) within each rack (602) are interconnected to one another through, for example, a rack switch, and the racks (602) within each datacenter (600) are also interconnected through, for example, a datacenter switch.

In some implementations, the processing modules (604) may each take on a role as a master or worker. The master modules control scheduling and data distribution tasks among themselves and the workers. A rack can include storage, like one or more network attached disks, that is shared by the one or more processing modules (604), and/or each processing module (604) may include its own storage. Additionally, or alternatively, there may be remote storage connected to the racks through a network.

The datacenter (600) may include dedicated optical links or other dedicated communication channels, as well as supporting hardware, such as modems, bridges, routers, switches, wireless antennas, and towers. The datacenter (600) may include one or more wide area networks (WANs) as well as multiple local area networks (LANs).

Figure 7:
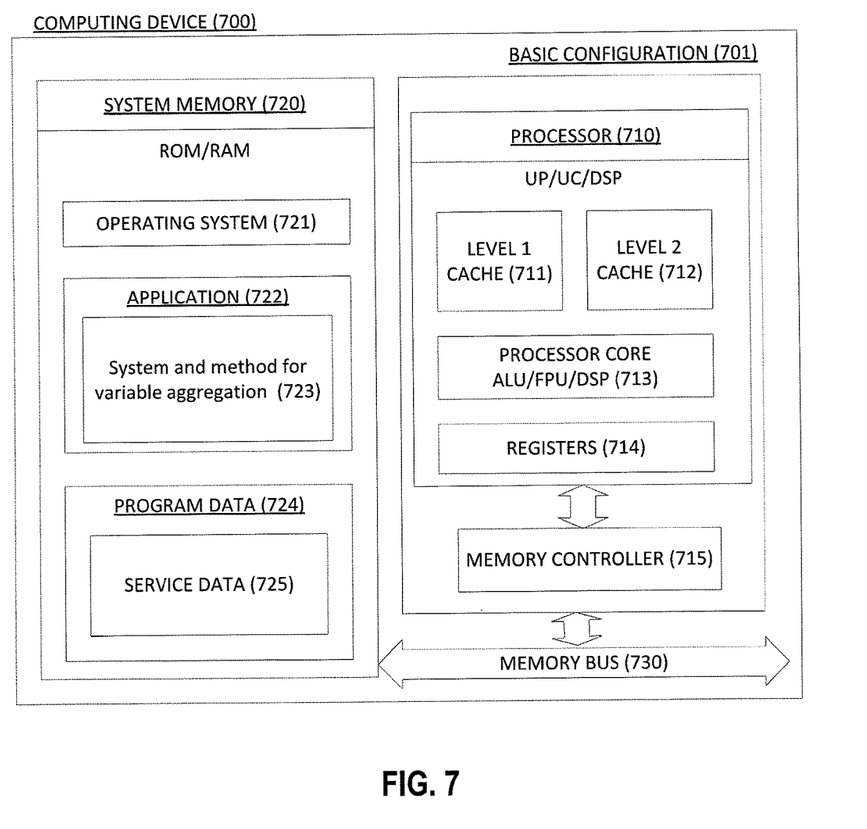
FIG. 7 is a block diagram illustrating an exemplary computing device.

FIG. 7 is a block diagram illustrating an example computing device (700) that is arranged for parallel processing of data and may be used for one or more of the processing modules (604). In a very basic configuration (701), the computing device (700) typically includes one or more processors (710) and system memory (720). A memory bus (730) can be used for communicating between the processor (710) and the system memory (720).

Depending on the desired configuration, the processor (710) can be of any type including but not limited to a microprocessor (µP), a microcontroller (µC), a digital signal processor (DSP), or any combination thereof. The processor (710) can include one more levels of caching, such as a level one cache (711) and a level two cache (712), a processor core (713), and registers (714). The processor core (713) can include an arithmetic logic unit (ALU), a floating point unit (FPU), a digital signal processing core (DSP Core), or any combination thereof. A memory controller (716) can also be used with the processor (710), or in some implementations the memory controller (715) can be an internal part of the processor (710).

Depending on the desired configuration, the system memory (720) can be of any type including but not limited to volatile memory (such as RAM), non-volatile memory (such as ROM, flash memory, etc.) or any combination thereof. System memory (720) typically includes an operating system (721), one or more applications (722), and program data (724). The application (722) may include steps for asynchronous message passing among workers by variable aggregation. Program Data (724) includes storing instructions that, when executed by the one or more processing devices, implement a system and method for variable aggregation and asynchronous communication within a large-scale data processing job (723). In some embodiments, the application (722) can be arranged to operate with program data (724) on an operating system (721).

The computing device (700) can have additional features or functionality, and additional interfaces to facilitate communications between the basic configuration (701) and any required devices and interfaces.

System memory (720) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of the device (700).

The computing device (700) can be implemented as a portion of a small-form factor portable (or mobile) electronic device such as a cell phone, a personal data assistant (PDA), a personal media player device, a wireless web-watch device, a personal headset device, an application-specific device, or a hybrid device that include any of the above functions. The computing device (700) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method in a distributed data processing job comprising:
   executing a plurality of processes on a plurality of interconnected hardware processing devices, wherein a plurality of the processes are worker processes;
   executing a master process configured to control scheduling and data distribution tasks among the plurality of worker processes, wherein the master process is not one of the worker processes;
   assigning the plurality of worker processes to a group identified from the master process;
   identifying as a lead worker one of the plurality of worker processes that has been assigned to the group identified from the master process;
   associating a metric variable with the group identified from the master process, wherein the metric variable is an amount of a shared resource used by the worker process;
   by each of the worker processes of the plurality of worker processes assigned to the group identified from the master process:
      generating a value for the metric variable based on the worker processes' usage of the shared resource; and
      posting the value for the metric variable to be aggregated by the lead worker;
   asynchronously aggregating, by the lead worker, the posted values for the metric variable into an aggregated value;
   asynchronously announcing, by the lead worker, the aggregated value to the worker processes; and
   identifying one or more of the plurality of worker processes, other than the lead worker, as a standby lead worker, each of which maintains a history of worker processes' posts, preserves the aggregated value, and is configured to take over as lead worker if the lead worker fails or leaves the group.

2. The computer-implemented method of claim 1, wherein identifying as a lead worker one of the worker processes comprises use of an election-protocol.

3. The computer-implemented method of claim 1, wherein the aggregating posted values for the metric variable into an aggregated value comprises using one or more of the posted values for the metric variable as a parameter of an aggregation function.

4. The computer-implemented method of claim 3, wherein the aggregation function is one of the group consisting of:
   a summation aggregator that adds posted values for the metric variable into a sum;
   a minimum aggregator that provides a minimum value of the posted values for the metric variable;
   a maximum aggregator that provides a maximum value for the posted values for the metric variable;
   an average aggregator that provides an average of the posted values for the metric variable;
   a histogram aggregator that provides a histogram of the posted values for the metric variable;
   a string-set aggregator that provides a set union of the posted values for the metric variable;
   an echo aggregator that provides a most recent of the posted values for the metric variable;
   a resource limit aggregator that provides a claimable amount of resources each worker process; and
   an on demand variable set aggregator that creates an aggregated variable on demand by name in response to a shared list of known variables.

5. The computer-implemented method of claim 3, wherein the aggregation function is defined by the worker processes.

6. The computer-implemented method of claim 1, further comprising delaying the announcing.

7. The computer-implemented method of claim 1, wherein the group identified from the master process is created based on at least a specification of a job to be processed.

8. A system for distributed processing of data, the system comprising:
   one or more hardware processing devices;
   one or more hardware storage devices storing instructions that, when executed by the one or more hardware processing devices, cause the one or more hardware processing devices to:
   execute a plurality of processes on the one or more hardware processing devices, wherein a plurality of the processes are worker processes;
   execute a master process configured to control scheduling and data distribution tasks among the plurality of worker processes, wherein the master process is not one of the worker processes;
   assign the plurality of worker processes to a group identified from the master process;
   identify as a lead worker one of the plurality of worker processes that has been assigned to the group identified from the master process;
   associate a metric variable with the group identified from the master process, wherein the metric variable is an amount of a shared resource used by the worker process;
   by each of the worker processes of the plurality of worker processes assigned to the group identified from the master process:
      generate a value for the metric variable based on the worker processes' usage of the shared resource; and
      post the value for the metric variable to be aggregated by the lead worker;
   asynchronously aggregate, by the lead worker, the posted values for the metric variable into an aggregate value;
   asynchronously announce, by the lead worker, the aggregated value to the plurality of worker processes;
   identifying one or more of the plurality of worker processes, other than the lead worker, as a standby lead worker, each of which maintains a history of worker processes' posts, preserves the aggregated value, and is configured to take over as lead worker if the lead worker fails or leaves the group.

9. The system of claim 8, wherein the lead worker is chosen by an election-protocol.

10. The system of claim 8, wherein the aggregating further comprises posted values for the metric variable into an aggregated value comprises using one or more of the posted values for the metric variable as a parameter of an aggregation function.

11. The system of claim 10, wherein the aggregation function is one of the group consisting of:
- a summation aggregator that adds posted values for the metric variable into a sum;
- a minimum aggregator that provides a minimum value of the posted values for the metric variable;
- a maximum aggregator that provides a maximum value for the posted values for the metric variable;
- an average aggregator that provides an average of the posted values for the metric variable;
- a histogram aggregator that provides a histogram of the posted values for the metric variable;
- a string-set aggregator that provides a set union of the posted values for the metric variable;
- an echo aggregator that provides a most recent of the posted values for the metric variable;
- a resource limit aggregator that provides a claimable amount of resources each worker process; and
- an on demand variable set aggregator that creates an aggregated variable on demand by name in response to a shared list of known variables.

12. The system of claim 8, wherein an aggregation function is defined by the worker processes.

13. The system of claim 8, wherein the instructions further cause the one or more processing devices to delay the announcing.

14. The system of claim 8, wherein the group identified from the master process is created based on at least a specification of a job to be processed.

* * * * *